Figure 1:
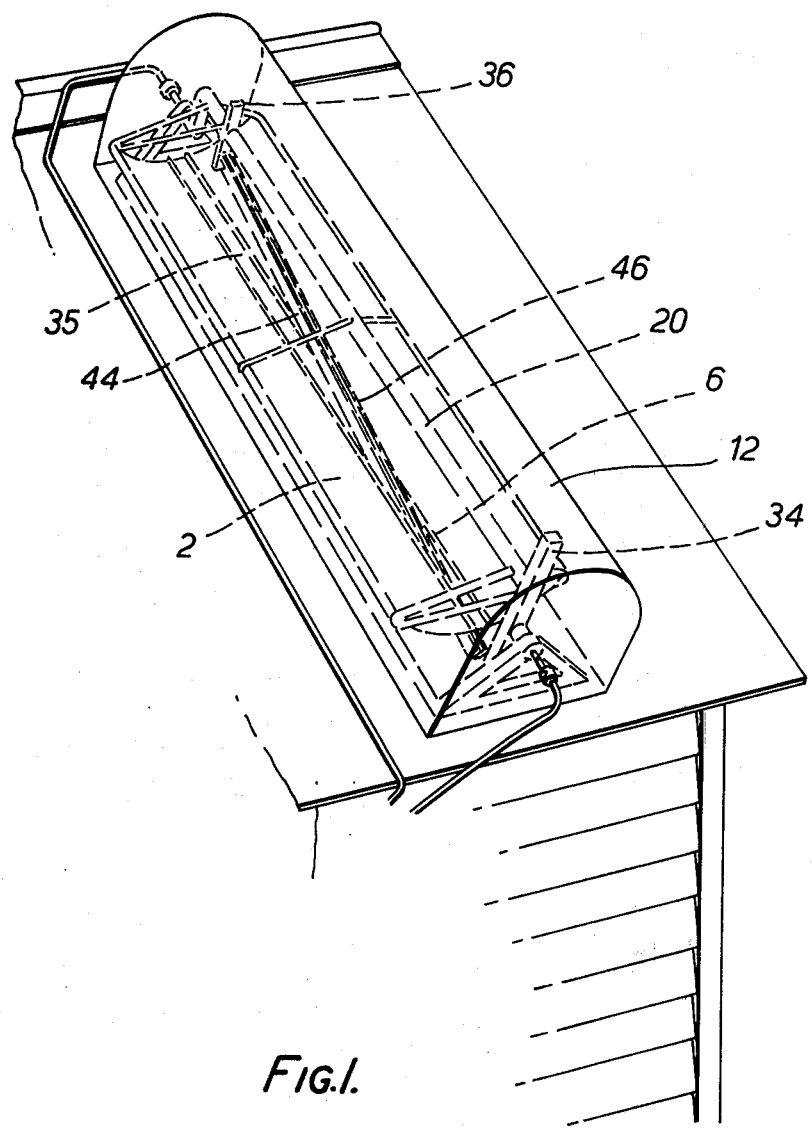

United States Patent [19]

Trihey

[11] 4,304,221

[45] Dec. 8, 1981

[54] SOLAR TRACKING DEVICE

[75] Inventor: John M. Trihey, Bayswater, Australia

[73] Assignee: Vulcan Australia Limited, Victoria, Australia

[21] Appl. No.: 953,771

[22] Filed: Oct. 19, 1978

Related U.S. Application Data

[63] Continuation-in-part of Ser. No. 883,313, Mar. 3, 1978, which is a continuation-in-part of Ser. No. 704,674, Jul. 12, 1976, Pat. No. 4,089,323.

[30] Foreign Application Priority Data

Jul. 11, 1975 [AU] Australia ............................. 2334/75
Apr. 21, 1977 [AU] Australia .................................. 9839
Apr. 21, 1978 [JP] Japan ................................ 53-048293

[51] Int. Cl.³ ............................................. F24J 3/02
[52] U.S. Cl. .................................. 126/425; 126/438; 126/424; 126/439; 350/289
[58] Field of Search .............. 126/438, 439, 424, 425, 126/450; 350/289; 250/203 R

[56] References Cited

U.S. PATENT DOCUMENTS

| 1,951,404 | 3/1934 | Goddard | 126/425 |
| 3,976,508 | 8/1976 | Mlausky | 126/443 |
| 4,027,651 | 6/1977 | Robbins, Jr. | 126/425 |
| 4,077,392 | 3/1978 | Garner | 126/438 |

Primary Examiner—Larry Jones
Attorney, Agent, or Firm—Cushman, Darby & Cushman

[57] ABSTRACT

Solar tracking apparatus is disclosed which utilizes received solar energy to effect tracking movements, the apparatus comprising focussing means, mounting means mounting the focussing means for tracking movements of the sun, drive means including heat expansible members movable with the focussing means, the heat expansible members being disposed relative to the focussing means so as to receive different amounts of solar radiation from the focussing means when the focussing means is misaligned with the sun so as to produce a differential expansion therein, the drive means being operable on differential expansion of said heat expansible members to cause movement of the focussing means in a direction towards realignment with the sun.

30 Claims, 28 Drawing Figures

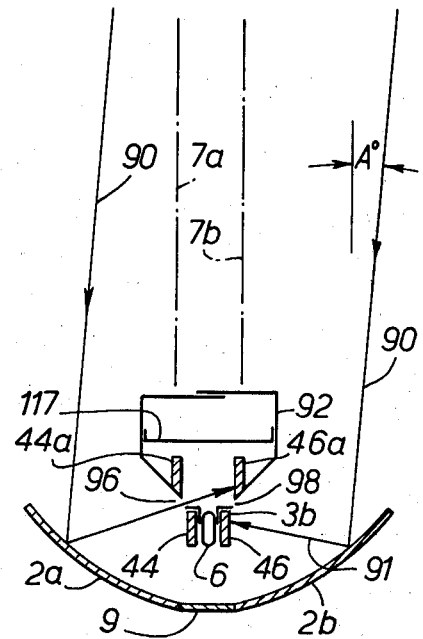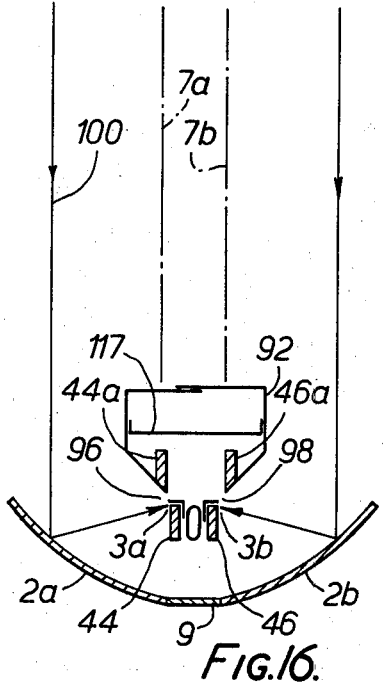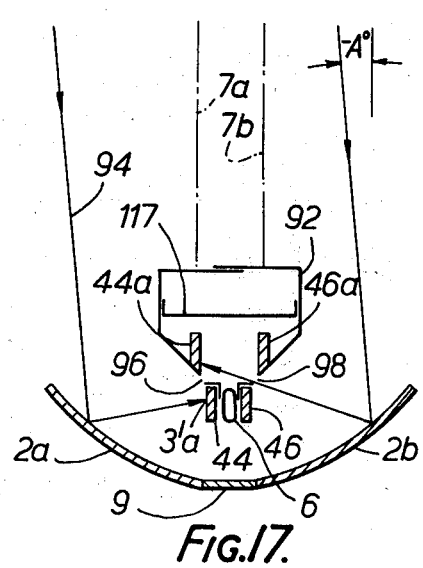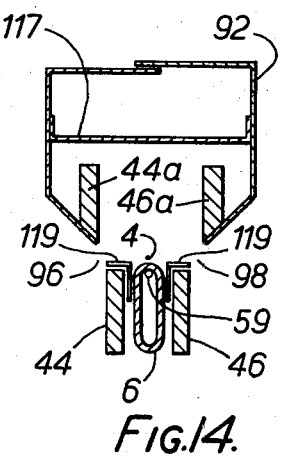

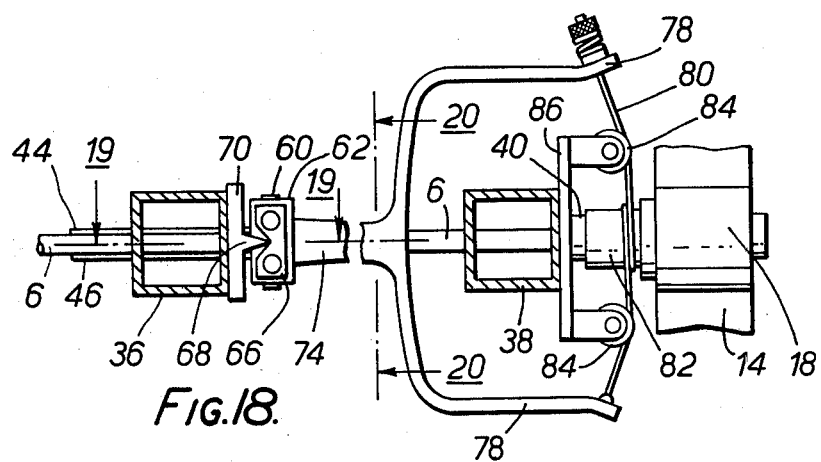
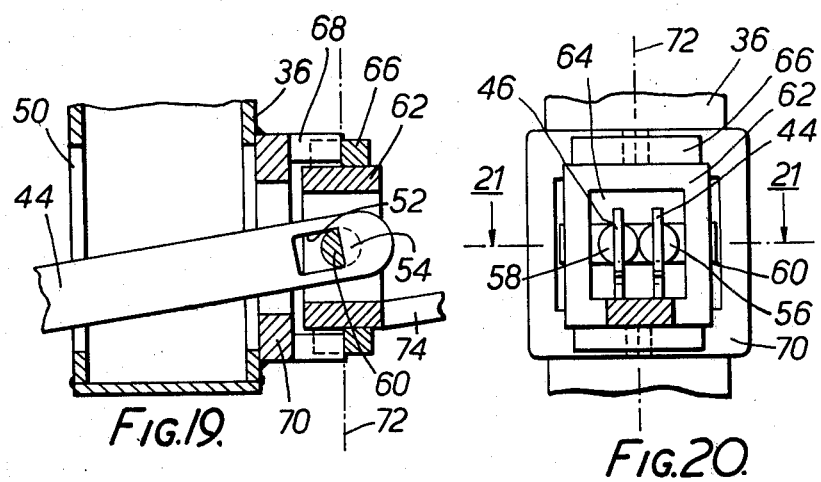
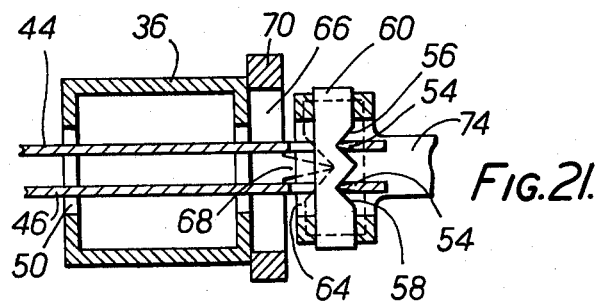

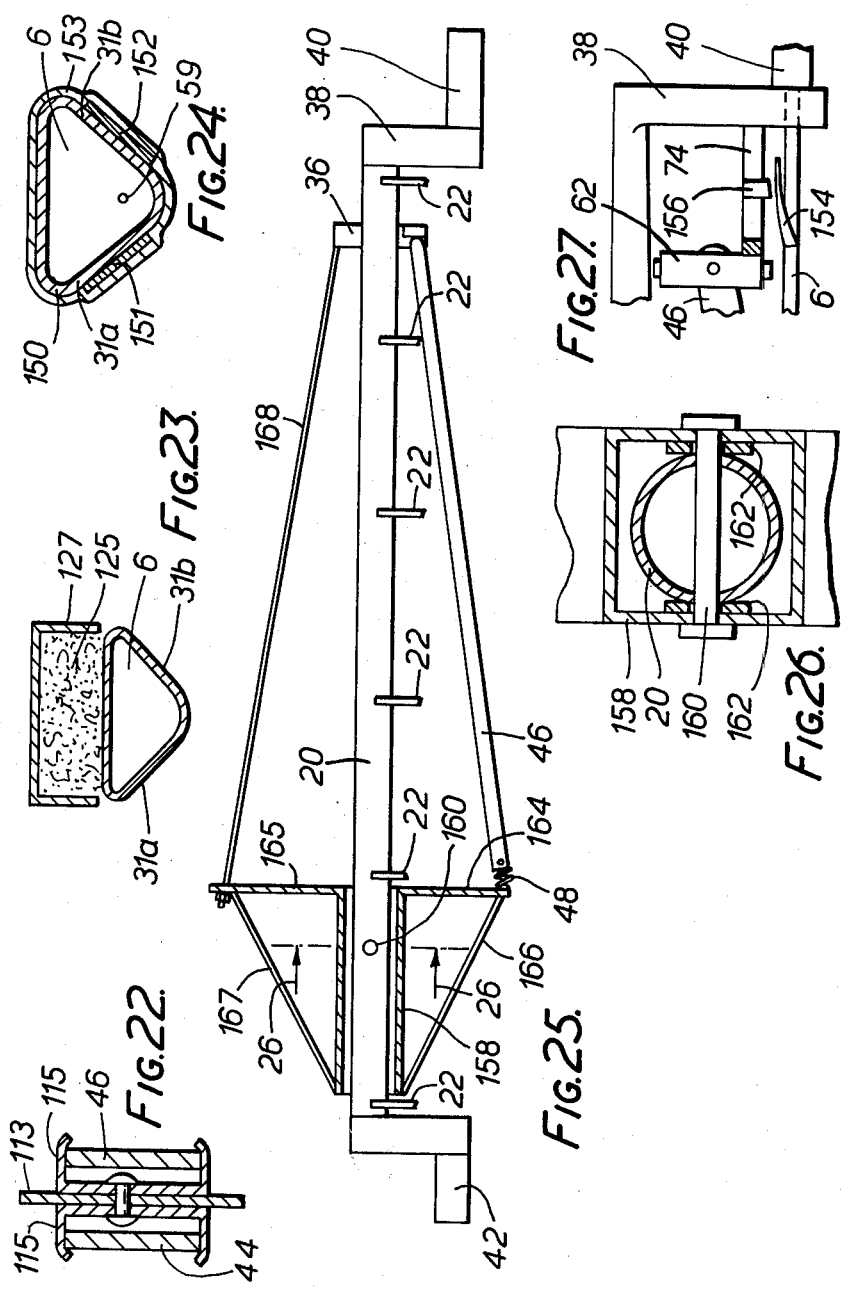

SOLAR TRACKING DEVICE

This application is a continuation-in-part of application Ser. No. 883,313 filed Mar. 3, 1978, which is a continuation-in-part of application Ser. No. 704,674 filed July 12, 1976, now U.S. Pat. No. 4,089,323.

This invention relates to solar tracking apparatus and is particularly but not exclusively useful for solar energy conversion apparatus.

The general object of the present invention is to provide solar tracking apparatus which does not require external energy input to effect tracking movement. Energy for the tracking movement is derived directly from received solar energy and such an apparatus has the advantage that its reliability is not dependent upon the reliability of an external source of energy. Further, it is of simple construction since it does not require electric, hydraulic or clockwork components in the driving means for effecting tracking movements.

Within the present invention there is provided solar tracking apparatus for tracking the sun comprising focussing means, mounting means mounting the focussing means for tracking movements of the sun, drive means including heat expansible members movable with the focussing means, said heat expansible members being disposed relative to the focussing means so as to receive different amounts of solar radiation from the focussing means when the focussing means is misaligned with the sun so as to produce a differential expansion therein, the drive means being operable on differential expansion of said heat expansible members to cause movement of the focussing means in a direction towards realignment with the sun.

Focussing means may comprise a reflective parabolic trough and the mounting means is arranged to mount the trough for rotation about a pair of perpendicular axes which intersect at the focus of the trough.

Alternatively, the focussing means comprises a reflective parabolic trough and the mounting means is arranged to mount the trough for rotation about the focal line of the trough.

It has been found that when the focal plane of the trough is not pointed directly at the sun, solar energy is focussed into two partially focussed lines which are located inwardly and outwardly of the true focal line of the trough. The heat expansible element or elements are disposed so as to receive energy in one or other of said partially focussed lines and accordingly have differential amounts of energy focussed upon them when the focal plane of the reflective trough is not directed at the sun. The consequential expansion of the element or elements is used to effect correcting movement of the trough to re-align the trough so that its focal plane agains includes the sun and the two partially focussed lines move back to the true focal line of the trough whereupon the element or elements have equal amounts of solar energy focussed upon them. In practice, it is necessary that the focal plane of the trough is very slightly misaligned with the sun in order to have a stable temperature differential between the elements to hold the correct position of the trough when not at its rest position.

In an alternative form of the invention the trough is split into two spaced portions each of which produces its own focal line. In this arrangement when the troughs are correctly aligned with the sun, it is desirable that the elements are located so as to have some energy focussed upon them, so that the slightest misalignment will cause full energy to be applied to one element and none to the other to thereby permit very accurate tracking to be accomplished.

In one form of the invention, the trough is balanced about its centre of gravity and the expansion of the heat expansible element or elements is arranged to move a weight so as to unbalance the trough whereupon the tracking movements are effected by gravitational forces acting upon the unbalanced trough.

However, in a preferred form of the invention the drive means includes a mechanical interconnection between the heat expansible element or elements and the mounting means to thereby directly effect the necessary rotational movmements of the trough.

Where the tracking apparatus is used in conjunction with solar energy conversion apparatus it is known that such a combination will be inherently efficient because of the high temperatures which are available. However, the tracking arrangement has the disadvantage that it is not particularly efficient as a solar energy conversion apparatus on days where the sky is overcast and only diffuse solar energy is received. However, on such days the so-called "black plate" absorber type solar energy collectors still function reasonably efficiently in such conditions. In accordance with a further aspect of the invention there is provided solar energy collecting apparatus comprising solar tracking apparatus for focussing solar energy upon energy collecting means, said tracking means being mounted in a housing at least part of which is substantially transparent to solar energy and a black plate type solar energy absorber located generally beneath the tracking apparatus and within the said housing. It is preferred that the solar energy collecting means includes a tube for transmitting heat transfer fluid, and the absorber being coupled to said tube and acting as a preheater for the heat transfer fluid.

In any solar energy conversion apparatus it may be desirable to produce at least part of the output in the form of electrical energy. In installations where a focussing arrangement is provided it has not been feasible to use photoelectric elements at the focus of the reflector since the efficiency of the elements decreases with increased temperature. It is now proposed to provide a composite heat absorbing element at the focus of the reflector which comprises a conduit for heat transfer fluid and a plurality of photo electric elements mounted directly upon the conduit and in thermal contact therewith. The heat transfer fluid passing through the conduit acts as a cooling medium for the photo electric elements, preventing their temperature from becoming excessive. The photo electric elements directly produce electrical energy and the heat transfer fluid produces heat energy which is utilised in the traditional manner.

According to a further aspect of the invention there is provided a parabolic trough comprising a plurality of formers each having a concave parabolic edge, connecting means interconnecting the formers together such that their parabolic edges lie upon a common parabolic surface, a sheet of resilient material and mounting means for mounting the sheets such that one face thereof is biased into engagement with the parabolic edges of the formers whereby the sheet assumes the configuration of a concave parabolic trough. Such a technique of fabrication of a parabolic trough is particularly suitable for making parabolic reflectors since the sheet may simply comprise a sheet of reflective material such as a sheet of polished aluminium.

Figure 2:
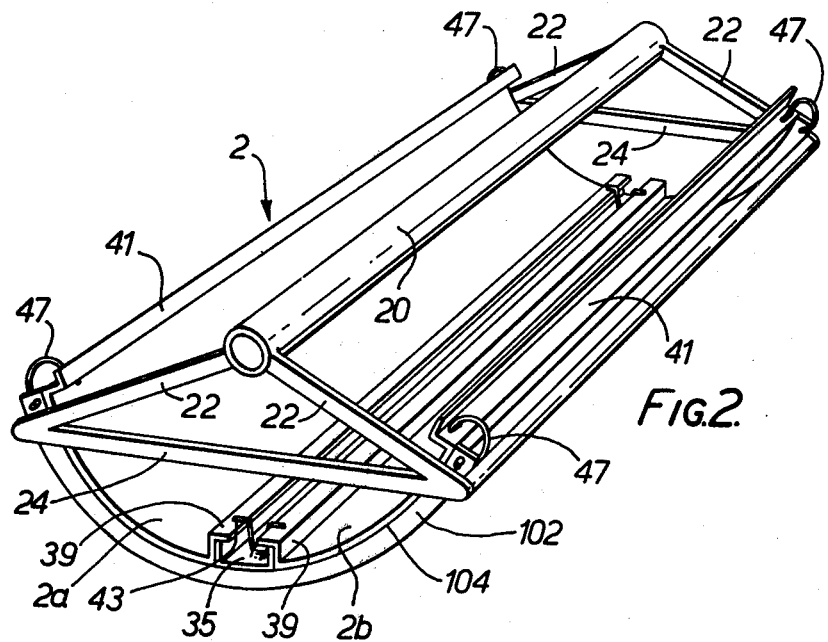
Figure 2A:
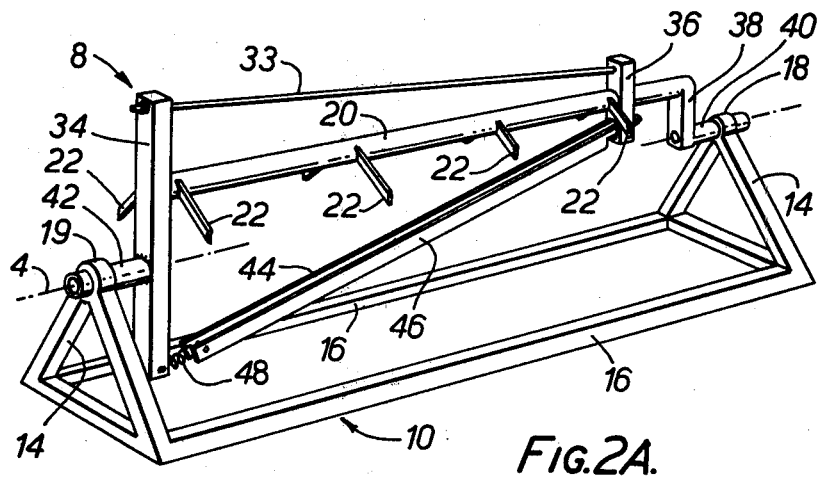
Figure 3:
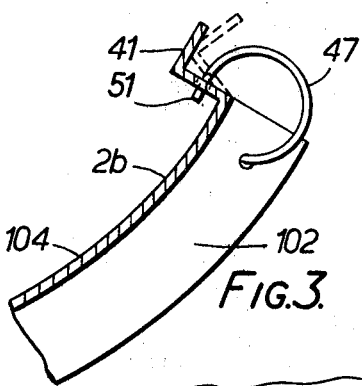
Figure 4:
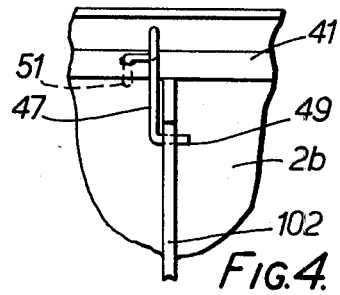
Figure 6:
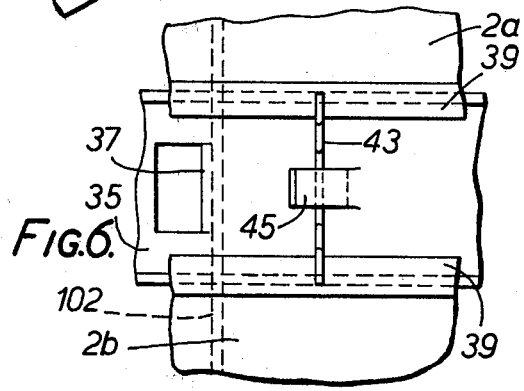
Figure 5:
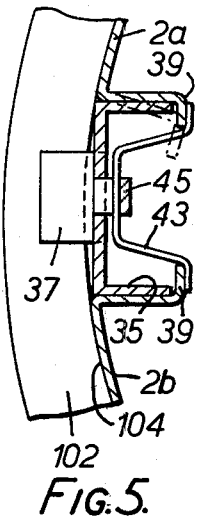
Figure 7:
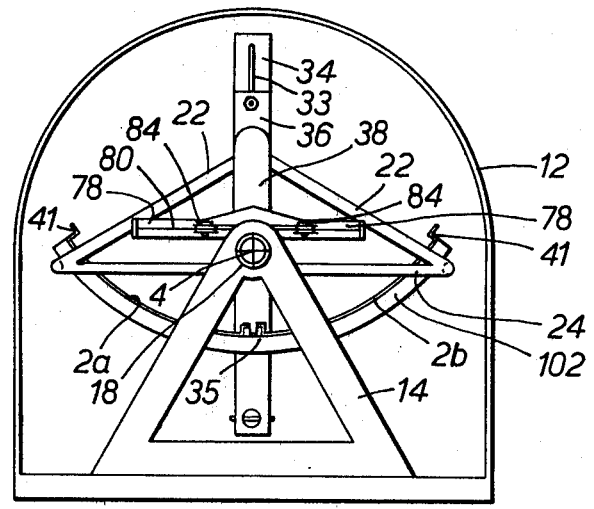
Figure 8:
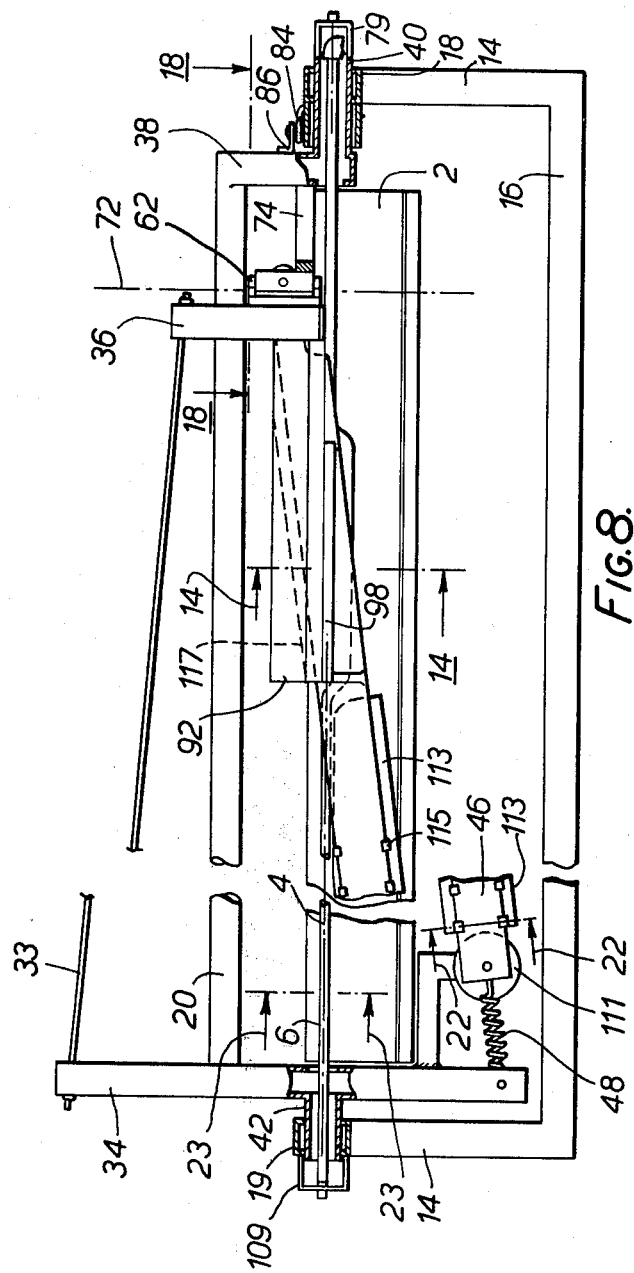
Figure 9:
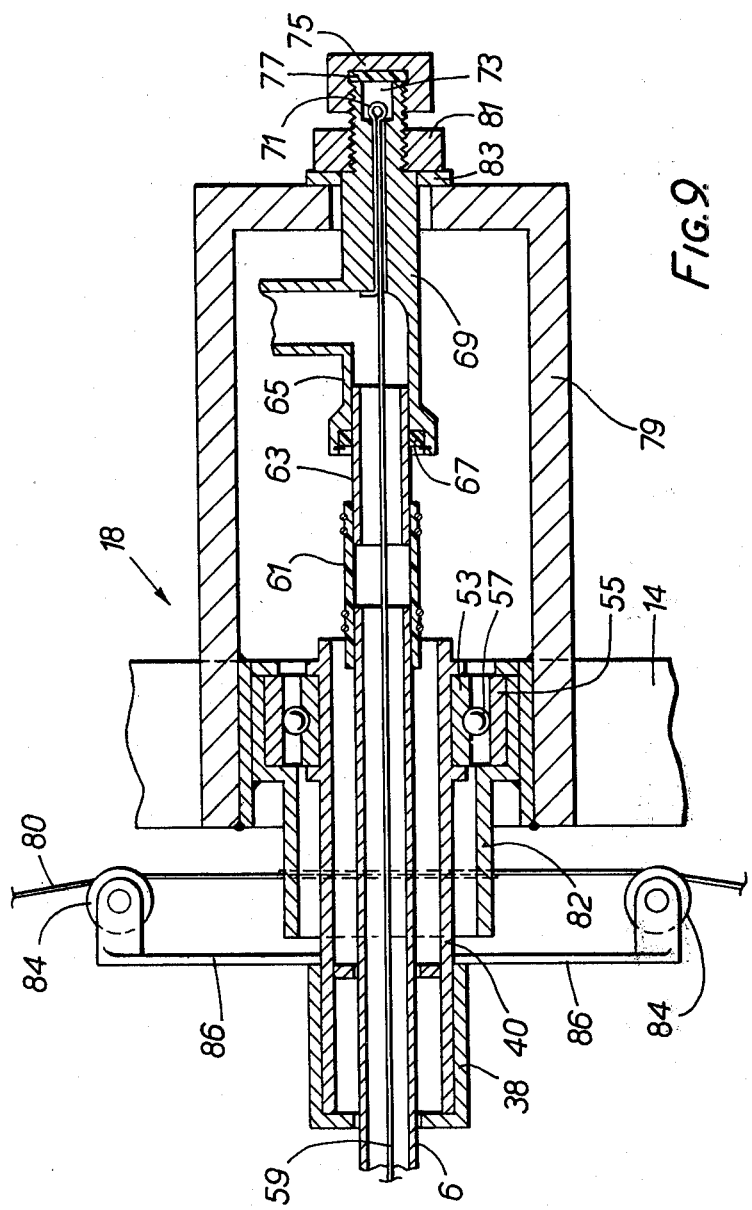
Figure 10:
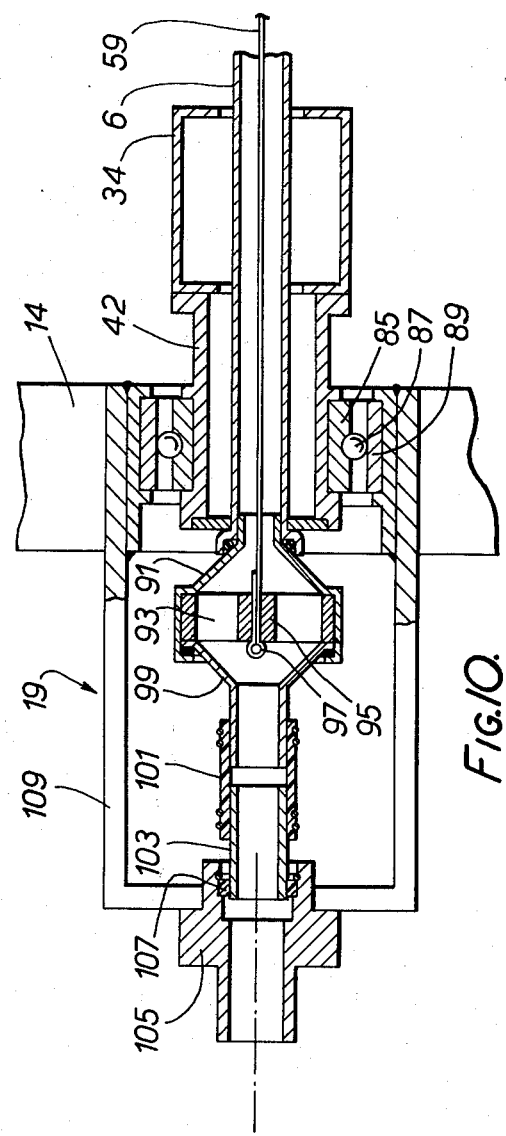
Figure 11:
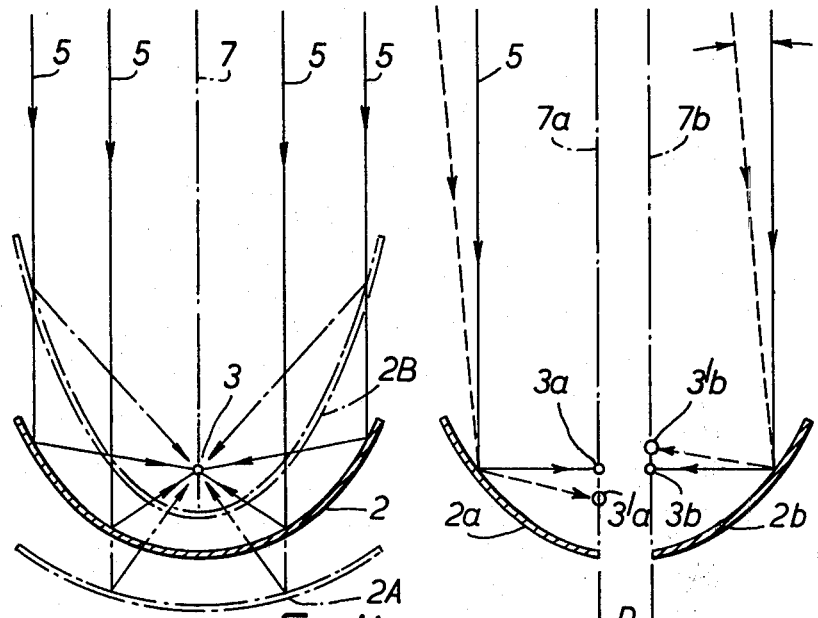
Figure 12:
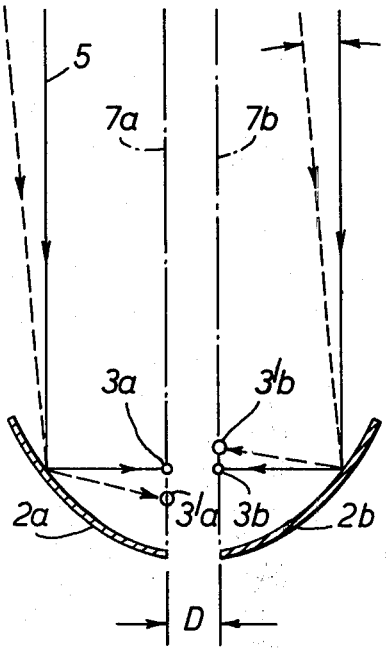
Figure 13:
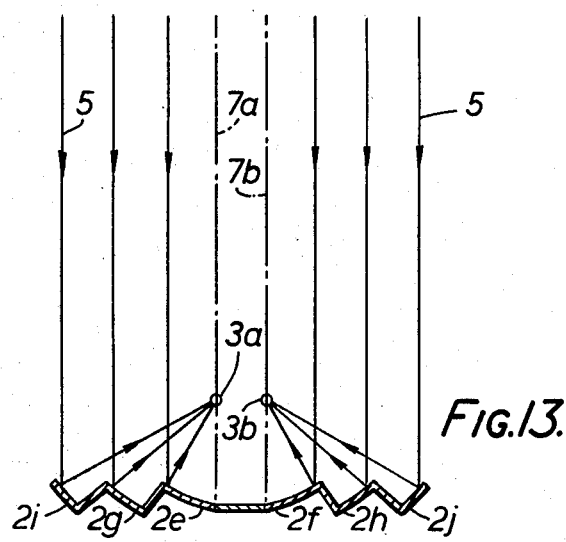

The invention will now be further described with reference to the accompanying drawings, in which:

FIG. 1 is a perspective view showing a solar energy conversion apparatus embodying the invention mounted on the roof of a house, FIGS. 2 and 2A are perspective views of part of the parabolic reflector and its support structure respectively, FIG. 3 is a cross sectional detail showing the manner of construction of the parabolic reflector, FIG. 4 is a side view of the detail illustrated in FIG. 3, FIG. 5 is a cross sectional view through the central portion of the reflective trough, FIG. 6 is a detailed plan view at the central portion of the trough, FIG. 7 is an end view of the apparatus illustrated in FIG. 1, FIG. 8 is a side elevation of one form of the invention, FIG. 9 is a detail of the upper bearing for the trough, FIG. 10 is a detail of the lower bearing for the trough, FIGS. 11, 12 and 13 are diagrams useful in understanding the principles of operation of the invention, FIG. 14 is a cross sectional view taken along the line 14—14 marked on FIG. 8, FIGS. 15, 16 and 17 correspond generally to FIG. 14 and illustrate the mode of operation of the apparatus of the invention, FIG. 18 is a cross sectional view taken along the line 18—18 marked on FIG. 8, FIG. 19 is a cross sectional view taken along the line 19—19 marked on FIG. 18, FIG. 20 is a cross sectional view taken along the line 20—20 marked on FIG. 18, FIG. 21 is a cross sectional view taken along the line 21—21 marked on FIG. 20, FIG. 22 is a cross sectional view taken along the line 22—22 marked on FIG. 8, FIG. 23 is a cross sectional view of the head collecting tube taken along the line 23—23 marked on FIG. 8, FIG. 24 illustrates a modified form of heat transfer tube, FIGS. 25 and 26 illustrate a preferred form of support structure for the trough, and FIG. 27 illustrates schematically one arrangement for preventing over-heating of the apparatus.

The solar energy conversion apparatus of the invention comprises a reflective trough 2 having parabolic portions 2a and 2b having focal planes 7a and 7b and connected by a flat 9 at the base of the trough. As seen in FIGS. 7 and 12 the trough 2 is mounted for rotation about an axis 4 which is midway between focal lines 3a and 3b of the parabolic portions 2a and 2b of the trough. A heat transfer tube 6 for passage of a heat transfer fluid extends along the axis 4 but has dimensions such that the focal lines 3a and 3b impinge on or near its surface. The preferred cross sectional configuration of the tube 6 is shown in FIG. 23, the tube having flats 31a and 31b facing the portions 2a and 2b of the trough. The upper part of the tube is preferably insulated by insulation 125 located within a channel 127, as seen in FIG. 23. The trough 2 is carried by a trough support structure generally indicated by 8, the structure 8 being mounted for rotation in a framework 10 as shown in FIG. 2A. The trough support structure 8 and framework 10 are mounted within a housing 12 (which has only been illustrated in FIGS. 1 and 7 for clarity of illustration). The upper part of the housing 12 is made from glass or acrylic material so as to be substantially transparent to solar energy.

Referring now more particularly to FIG. 2A, the framework 10 comprises a pair of triangular end supports 14 the lower parts of which are interconnected by two elongate lower beams 16, the apices of the triangular supports 14 carrying upper and lower bearings 18 and 19 for mounting the trough support structure 8. The trough support structure 8 comprises an elongate beam 20 from which a number of transverse arms 22 project for providing support for the side edges of the trough 2. The end of the beam 20 is connected to upright transverse beams 34 and 36 each extending above and below the beam 20. In addition, a short transverse beam 38 extends downwardly from one end of the beam 20. The framework 8 has a pair of tubular spigots 40 and 42 which project outwardly from the end transverse beams 38 and 34 and are received within the bearings 18 and 19 so that the support structure 8 is rotatably mounted within the framework 10 about the axis 4. The framework 8 also includes a tension member 33 extending between the free ends of the beams 34 and 36.

The support structure 8 and trough 2 are arranged to be balanced (or nearly so) so that their combined centre of gravity is co-incident with the axis 4 so as to minimize the forces required to effect rotation of the tough. In practice the support structure could be provided with adjustable weights to achieve the correct balancing. Additionally the arrangement is preferably such that the trough is slightly biased away from the centre position as illustrated in FIG. 7.

The novel technique for forming the parabolic trough 2 is illustrated in FIGS. 2 to 6. In this arrangement, there is a plurality of ribs 102 each of which is formed with a concave edge 104 which is parabolic in shape. The reflective trough 2 is formed by resiliently depressing a flat sheet of reflective material such as aluminium into contact with the parabolic edges 104 of the ribs 102. In this manner an accurately formed parabolic trough can be manufactured at very low cost. In the illustrated arrangement, the trough is formed in two portions 2a and 2b but the principles are equally applicable to a single parabolic trough. The upper ends of the ribs 102 are connected to the free ends of the arms 22 and the free ends of the arms 22 are additionally braced by bracing members 24. The centres of the ribs 102 are connected together by means of a longitudinally extending channel 35. The interconnection of the channel 35 and the ribs 102 is preferably by means of downwardly projecting tabs 37 punched from the web of the channel and affixed to the ribs 102. In the illustrated arrangement, the trough portions 2a and 2b are formed by flat sheets of aluminium which are formed with L-shaped flanges 39 and 41 along their inner and outer longitudinal edges respectively. The flanges 39 and 41 strengthen the side edges of the sheets and prevent unwanted distortions of the sheets in the unsupported regions between the ribs 102. Additionally, the flanges 39 and 41 are used in the connection of the sheets to the ribs.

As can be seen from FIGS. 2 and 5, the inner flanges 39 engage the upstanding legs of the central channel 35 and so locate the inner edges of the aluminium sheets. The flanges 39 are retained in position by means of clips 43 which extend from the web of the channel 35 and engage the top faces of the L-shaped flanges 39. The interconnection of the clips 43 with the web of the channel 35 is preferably by means of tabs 45 which are pressed from the web of the channel 35. As shown in FIG. 5, the L-shaped flange 39 is initially at right angles to the flat sheet of aluminium as indicated in broken lines in FIG. 5 but in its operative position it is deflected inwardly somewhat by the channel 35 and this assists in maintaining snug engagement of the sheet with the parabolic edge 104 of the rib to improve the fidelity of the resultant parabolic surface.

The outer L-shaped flanges 41 are used to interconnect the sheets to the upper ends of the ribs 102, as best seen in FIGS. 3 and 4. The clips 47 are provided with oppositely directed end portions 49 and 51 which pass through appropriately located recesses so as to hold the sheet in position firmly against the parabolic edge 104 of the ribs.

In addition to the clips 43 and 47, it is preferred that the inner flanges 39 are fixed at the centre of each sheet to the channel 35 so as to permit thermal expansion of the sheets in the longitudinal direction. Any thermal expansion of the sheets in the lateral direction is accommodated by means of flexure of the springs 47. The upper flange 41 is inclined somewhat outwardly of its final position as indicated in broken lines in FIG. 3 and this assists in attaining the correct parabolic configuration of the surface.

The details of a preferred form of upper bearing 18 are illustrated in FIG. 9. In this arrangement, the tubular spigot 40 has mounted thereon the inner race 53 of a ball bearing, the outer race 55 of which is connected to the triangular support 14. The inner race 53 is provided with an annular grove for receipt of spherical ball 57 in the usual manner. The outer race 55 is however not provided with a groove so that only the annular inner surface of the race makes contact with the balls 57. It has been found that a bearing produced in this manner has very low friction. A similar bearing could be made without any grooves to further reduce friction and reduce the likelihood of jamming where there are misalignments. Of course, such bearings cannnot support any axial thrust which is necessary when the apparatus is mounted on an angle as is illustrated in FIG. 1. The thrust exerted by the weight of the trough and its support structure 8 is arranged to be borne by a thin wire 59 which extends fully through the heat transfer tube 6 and is connected to the lower end of the support structure 8, in the manner illustrated in FIG. 10. The upper end of the wire 59 passes from the end of the tube 6 and is coupled to the end support 14 in the manner illustrated in FIG. 9. The end of the tube 6 is connected to a length of rubber tube 61 which in turn is connected to a tube 63 of low friction plastics material, the end of the tube 63 being received within a stationary fluid coupling 65, the coupling being formed with a recess in which a seal 67 is located. It has been found that the tube 61 and 63 together with the seal 67 form an effective rotatable coupling for the heat transfer tube 6. The end of the wire 59 passes through a boss 69 formed in the coupling 65 and is formed with a loop 71 located in a recess 73. The recess is closed by means of a threaded cap 75 which is threaded onto a threaded portion of the boss 69. A seal 77 is interposed between the end of the boss and the inside of the cap 75. The fluid coupling 65 is housed within and supported by a generally cup shaped support member 79 which is fixedly connected to the triangular support 14. An adjusting nut 81 is provided on the threaded portion of the boss 69 and it is used to adjust the axial position of the boss 69 and hence of the wire 59 with respect to the stationary cup 79. A washer 83 is interposed between the nut 81 and the end of the cup support 79.

The lower bearing 19 is illustrated in FIG. 10 and it can be seen that the tubular spigot 42 extends from the beam 34 into a recess provided in the triangular support 14. The free end of the spigot 42 is provided with a grooved inner ball race 85 for receipt of balls 87, the balls co-operating with an annular outer race 89 which is connected to the support 14. The end of the tube 6 is connected to a cone shaped support 91 which carries a spider 93 having a hub 95 through which the end of the wire 59 extends. The wire 59 is formed with a loop 97 for forming a connection with the outer face of the hub 95. In this manner substantially all of the axial forces at the bearing 19 are borne by the wire 59. The rotations of the trough cause torsional twisting of the wire 59 but the tortional resistance of the wire is exceedingly small over its length. The fluid coupling is completed by means of a funnel shaped member 99 which is connected to the cone shaped support 91, a rubber tube 101 being connected to the tubular portion of the support 99. The other end of the tube 101 is coupled to a tube 103 of low friction material which in turn is inserted into the end of a stationary fluid coupling 105 which has a seal 107 located in a recess therein. The fluid coupling 105 is supported by a cup shaped support 109 projecting outwardly from the triangular support 14.

In the illustrated arrangement, the heat transfer tube 6 is rotatable with the trough and support structure 8 but it is to be understood that the tube 6 could be stationary since it is located along the axis 4 of rotation.

In order for the sun's rays to be focussed by the trough 2 onto the heat transfer tube 6, it is necessary that the trough be made to track the sun. In the arrangement described herein the tracking is in azimuth only i.e. the trough follows the movement of the sun from its rise in the east to setting in the west each day. The principles upon which the invention relies to effect tracking movements can best be appreciated with reference to FIGS. 11 to 13.

FIG. 11 shows a cross section through the trough 2 (which need not be formed with a flat at its centre) and having a focal line 3. A well known property of parabolas is that all rays 5 impinging on the trough and parallel to the principle plane 7 are reflected through the focal line 3. When the trough is used for collecting solar energy, heat absorbing means is located along the focal line and will thereby receive substantially all of the solar energy reflected from the trough 2. FIG. 11 also illustrates that the profile of the parabola can be altered to the form as indicated by the parabolas 2A and 2B shown in broken and chain lines respectively without losing any energy gathering performance and this provides some flexibility in the location of the trough relative to the focal line 3.

FIG. 12 illustrates the trough divided into two portions 2a and 2b which are spaced apart by a distance D. Each portion produces its own focal line 3a and 3b respectively, the focal line 3a and 3b being separated by the distance D. A single heat absorbing member can be located so as to have energy focussed thereon by the two portions 2a and 2b, as for instance with the flats 31a and 31b of the tube 6 as is illustrated in FIG. 23.

Referring back to FIG. 11, the single parabola can be considered as two separate parabolic portions which lie upon the same parabolic surface and thus the focii of the two portions are co-incident at the true focus 3 of the trough.

FIG. 12 illustrates the effect of light impinging upon the trough portions at angles A° relative to the principle planes 7a and 7b of the trough portions. It will be noted that the sharp focal lines become somewhat defocussed and such defocussed lines will be referred to hereinafter as "quasi-focal lines". Further, for deviation of A° to the left as seen in FIG. 12, the quasi-focal line 3a migrates somewhat downwardly and inwardly relative to the true position of the focal line 3a and the quasi-focal line 3b moves somewhat upwardly and outwardly. Correspondingly, when the deviation angle A° is to the right the quasi-focal line 3a moves upwardly and outwardly and the quasi-focal line 3b moves downwardly and inwardly. The two portions 2a and 2b could of course be formed as a single trough which has a flat 9 interconnecting the two portions 2a and 2b.

FIG. 13 illustrates a more complicated trough made up from a plurality of integral parabolic segments 2e to 2j but again forming spaced focal lines 3a and 3b.

In the present invention, the property of the migration of the quasi-focal lines is used to effect tracking movements by arranging for the quasi-focal lines to migrate onto heat sensitive elements to thus selectively heat one of the heat sensitive elements more than the other depending upon the direction of misorientation.

The arrangement for effecting tracking movements of the trough will now be described with particular reference to FIG. 8 and FIGS. 14 to 22. The arrangement includes two heat expansible metallic rods 44 and 46 having matt black surfaces for good energy absorption the rods being generally parallel and one end of each is connected to the transverse beam 34 by means of a spring 48. The rods are preferably connected to a block (not shown) to which the spring 48 is connected and guide means 111 is provided to bear against one or other of the rods 44 or 46 to restrain any rocking or sideways movement of the rods 44 and 46. The rods 44 and 46 lie in planes which are parallel to and closely spaced to the focal planes 7a and 7b of the trough portions 2a and 2b respectively. As seen in FIG. 8, the rods 44 and 46 extend generally diagonally at an angle of about 15° with respect to the focal lines 3a and 3b and their upper portions project from the trough and extend through an opening 50 formed into the transverse beam 36. The rods 44 and 46 extend through openings in the channel 35 and project beneath the trough 2. The rods extend diagonally so as to receive reflected radiation even when the trough is grossly misaligned with the sun in which case the quasi-focal lines lie close to the surface of the trough. The pair of diagonal rods 44, 46 could be replaced by arrays of parallel strips to achieve the same effect. As best seen in FIG. 19, the ends of the rods 44 and 46 are formed with openings 52, the forward portions of which are formed with pointed edges 54 which are located within respective V-notches 56 and 58 formed into a shaft 60 as best seen in FIG. 21. The shaft 60 extends between a pair of sides of body 62 having a central rectangular opening 64. The upper and lower ends of the body 62 are formed with V-notches 66 which receive knife edges 68 projecting outwardly from a mounting plate 70 which is connected to the upright transverse beam 36. The body 62 is held in engagement with the knife edges 68 by means of the tensile forces from the tension spring 48 transmitted through the rods 44 and 46. Thus, the body 62 is rotatable about an axis 72 which passes through the tips of the knife edges 68 and is perpendicular to the axis 4 of the trough or alternatively to the direction of the rods 44 and 46.

The body 62 has extending therefrom an arm 74 which branches into two arms 78 which serve as mounting points for a wire 80 which convolutes about a drum 82 which is fixedly connected to and extends inwardly from the support 14, as seen in FIG. 18. The wire 80 passes about a pair of rollers 84 which are mounted upon arms 86 projecting outwardly from the beam 38, the rollers 84 serving to maintain the lead-in and lead-out portions of the wire 80 about the drum 82 as two tangents to the drum 82.

In operation, differential thermal expansion of the rods 44 and 46 due to misalignments of the trough with the sun cause rotation of the body 62 about the axis 72 thus causing rotation of the arm 74. This causes consequential movement of the wire 80 relative to the drum 82 and such rotation of the arm 74 causes part of the wire 80 to wind onto the drum and a corresponding part to unwind from the drum accompanied by a rotation of the trough support structure 8 about the axis 4 of the trough.

In an alternative arrangement, the wire 80 could be replaced by a curved rack gear which meshes with a tooth gear which would replace the drum 82. Such a geared arrangement would function in a similar manner to the wire and drum arrangement as illustrated. In a further modified arrangement, the trough support structure 8 and components carried thereby are arranged to be balanced so that the centre of gravity of the rotatable assembly is co-incident (or nearly so) with the axis 4 of the trough. In such an arrangement, the body 62 is connected to symmetrically disposed weights which, when the body 62 is rotated from its central position, are shifted and so alter the overall centre of gravity of the rotatable assembly. The unbalanced assembly will then rotate in the appropriate direction so as to realign the focal plane of the trough with the sum. In one form of such apparatus the weights could be located in positions which correspond generally to the positions of the downwardly extending arms 78, but inwardly over the trough 2.

The rods 44 and 46 are located generally beneath the beam 20 and when the trough is directed at the sun, the beam 20 shades the rods from direct sunlight. Except at the region where the rods 44 and 46 cross over the focal lines 3a and 3b of the trough, the rods will not receive any solar energy reflected from the trough when the trough is directed at the sun. In the region of cross over of the rods with the focal lines, the rods will receive generally equal amounts of solar energy and any consequential thermal expansion of the rods will be the same in each rod and will not cause rotation of the body 62. Any slackness in the rods will be taken up by the spring 48 which also serves to compensate for the effects of changes in ambient temperature.

When the focal planes 7a and 7b of the trough are not directed at the sun the focal lines 3a and 3b become quasi-focus lines one of which moves laterally and downwardly relative to the true focal line and the other of which moves in generally the opposite direction that is upwardly and laterally in the opposite direction to the other quasi-focal line as illustrated diagrammatically in FIG. 12. As seen in FIG. 12, where there is a deviation of A° between the sun's rays 90 and the focal plane 7b, the reflected rays 91 will form a quasi-focal line 3b which impinges upon the rod 46 and so causes expansion thereof. The other quasi-focal line 3a will be above the rod 44 except for the portion which is above the level of the axis. However, this area of the rod 44 (and of the rod 46) is shielded from reflected radiation by means of a U-shaped reflective tunnel 92 which is mounted over the rods 44 and 46. Expansion of the rod 46 will cause the body 62 to pivot in an anti-clockwise direction as seen in FIG. 18 which will thus cause the trough support structure 8 to rotate clockwise (as seen in FIG. 15) by virtue of the interconnection of the wire and the drum 80 and 82. The clockwise rotation of the trough support structure will continue to a point where the focal planes 7a and 7b are parallel with the incident radiation 90 whereupon both rods 44 and 46 both receive radiation and rotation will cease with the focal plane being substantially correctly aligned with the sun, as shown in FIG. 16. To remain stable it is necessary for the rod 46 to receive more radiation than the rod 44 so the trough will be slightly misaligned in an anti-clockwise direction, except when the plane of the trough is vertical in which case the rods receive the same amount of radiation and are at the same temperature. Generally speaking, for stability, the amount of temperature differential of the rods increases linearly from the vertical position with the angular orientation of the trough. The requirement for increasing temperature differential with increasing orientation from the vertical can be off-set by weights which tend to rotate the trough away from its vertical position. A similar effect takes place when the sun's rays 94 are offset by an angle A° as seen in FIG. 17. This time the inward quasi-focal line 3a is focussed upon the rod 44 and the rod 46 does not receive any reflected radiation. Heating of the rod 44 will cause rotation of the body 62 in a clockwise sense as seen in FIG. 18 and this will produce rotation of the trough support structure 8 in an anti-clockwise sense as seen in FIG. 17 to correctly align the focal planes 7a and 7b with the sun's rays.

A reflective shield 113 is located between the rods 44 and 46 so as to prevent unwanted radiation striking the rods from the opposite side of the trough which would tend to counter the differential heating of the rods. The shield is carried by means of clips 115 which, in turn are carried by the rods 44 and 46 as illustrated in FIG. 22.

It will thus be appreciated that the tracking arrangement described herein can effect tracking movements of the trough without the need for any external energy input and relies solely on received solar radiation.

In the illustrated arrangement, the rods 44 and 46 includes slots 96 and 98 located generally at the region of intersection of the rods with the focal lines 3a and 3b of the trough. The purpose of the slots is to effectively double the amount of radiation available for fine tuning of the trough when at or near the point of correct alignment with the sun. As illustrated in FIG. 16 where the sun's rays 100 are parallel to the focal planes 7a and 7b of the trough the reflected rays will just impinge upon the lower portions of the rods 44 and 46 adjacent to their respective slots 96 and 98. When however the sun's rays are separated by an angle A as shown in FIG. 15 the quasi-focal line 3a will also impinge upon the rod 46, rays from the parabolic portion 2a passing through the slot 96 and impinging upon the rod 46. The quasi-focal line 3b will still impinge upon the rod 46 as before and thus the provision of the slots greatly increases the amount of heat applied to the rod 46 for effecting the necessary correcting movement. FIG. 17 illustrates a similar effect with a deviation angle of −A°. The target tube 6 is flattened and bent downwardly adjacent to the slots so as not to obstruct light passing through the slot in one rod to the other rod, as seen in FIG. 8. The housing 92 includes a reflective baffle 117 which assists in reflecting light onto one rod which has passed through the slot in the other rod. Unwanted reflected radiation is shielded by reflective elements 119 covering the upper surfaces of the rods at the slots, as seen in FIG. 14.

The preferred shape for the slots is apparent from FIGS. 8 and 14. The slot is parallel to the axis 4 and is formed by removing portions of the material of the rods, then bending the rods outwardly to form laterally projecting portions 44a and 46a above their respective slots.

The trough is balanced such that in the absence of any direct solar radiation the trough will return to a position in which the focal planes are vertical. Thus in the night or when the sun is behind thick cloud the trough 2 will be at the noon position which may be very substantially misaligned with the actual direction of the sun. For instance, in the morning when the sun rises the deviation is approximately 90° and no rays can strike the reflective part of the trough to initiate tracking. This potential problem could be avoided by having the top edges of the trough below the level of the focal lines 3a and 3b so that the sun's rays can directly impinge upon one of the rods 44 or 46 in the region above the top edges of the trough and below the focal lines 3a and 3b. Once one of the rods 44 or 46 has been heated it will cause at least some rotation of the trough and then the reflective interior of the trough will become effective. As the trough rotates to correct alignment the quasi-focal 3b or 3a will gradually move up the rod 46 or 44 (depending upon the direction of the misorientation) until the slots 98 or 96 are reached and thereafter correct tracking will continue as long as direct solar radiation is received. A similar effect is achieved in the illustrated arrangement by the lower portions of the rods 44 and 46 which extend below the trough 2.

In a prototype apparatus it has been found that a torque of approximately 650 cm-gms or a temperature differential of about 8.5° C. between the rods 44 and 46 is required to rotate the trough from its rest position through 90° so that the focal planes 7a and 7b are directed to the west or east. When the sun is at or near these extreme positions it is at its weakest but maximum torque is required at these times. The potential problem can be offset by loading the trough by means of eccentric weights or springs which assist the trough in moving to its extreme positions this can be done by putting a weight on the beam 20 which at the due east or due west position has a downward torque of just less than 650 cm-gms, the torque required to effect rotation through 90°. With this modification the apparatus has little difficulty in tracking the sun even when the received rays are very weak since the temperature differential required between the rods 44 and 46 is substantially reduced.

The heat transfer tube may have mounted thereon two rows of photo electric conversion elements (not shown) which are arranged to have solar energy focussed upon them from the trough 2 and excessive overheating of the photoelectric elements is avoided by arranging for them to be in intimate thermal contact with the heat transfer tube 6 which thus serves as a cooling agent for the elements. Such an arrangement has the advantage that it produces a certain proportion of electrical energy and the heat used to cool the elements is imparted to the heat transfer fluid in the tube 6 and thus is utilised in the normal manner.

In a modified form of the invention the trough could be made up from a row of dome portions arranged to more intensely heat some areas of the tube 6. In such an arrangement it would be desirable to track in elevation as well as azimuth but the former could be effected by clockwork or manually since the daily adjustment needed is small.

The trough 2 may have mounted beneath it one or a number of black plate solar absorbers which will receive various amounts of solar energy depending upon the orientation of the trough 2 with respect to the housing. Further, the absorbers will also receive diffuse solar radiation which is essentially not utilised by the trough 2. In order to improve the performance of the absorbers a pair of reflective plates may be provided so as to reflect light onto the absorbers. The reflectors can be fixed in location and in such a case it is preferred that they be set at about 45° with respect to the focal plane 7 of the trough 2. However, it is preferred that the reflectors be coupled to the trough 2 so as to rotate therewith to thereby reflect more light towards the absorbers. Maximum performance can be obtained by arranging for the rate of rotation of the reflectors to be approximately half the rate of rotation of the trough 2. This can of course be simply effected by having a drive sprocket or pulley mounted upon the shaft carrying the trough 2 coupled by means of chains or drive bands to sprockets or pulleys of different diameters to that provided on the trough shaft. Such a coupling will provide rotation in the required sense and at the required rate of rotation relative to that of the trough 2.

The arrangement described immediately above can be used most advantageously in a hot water system. The heat transfer tube 6 is arranged to draw from and to return very hot water to the upper part of a hot water storage tank, whereas the absorbers are arranged to draw from and to return relatively warm water to the lower part of the same tank. Hot water to be used is drawn from the top of the tank, where the water is hottest and cold water is replaced at the bottom of the tank.

FIG. 24 illustrates a modified form of heat transfer tube 6. In this arrangement, there is provided an inner tube 150 which is formed with the flats 31a and 31b as is illustrated in FIG. 3. The tube 150 is made from non-electrically conductive material such as glass or alternatively comprises a metal covered with insulating material such as vitreous enamel. Mounted on the flats 31a and 31b are thermo-electric elements 151 and 152, the elements 151 and 152 and the tube 150 being located within an outer tube 153 of transparent material such as glass, any gaps between the tubes 150 and 153 being filled by transparent plastics material. The arrangement is such that the thermo-electric elements 151 and 152 are electrically insulated from the inner tube 150 and the outer layer 153 serves to protect the surfaces of the elements. Even though the sun's rays are concentrated upon the thermo-electric elements 151 and 152 they are prevented from over heating by the heat transfer fluid passing through the inner tube 150.

FIG. 27 illustrates schematically one arrangement for causing the apparatus to stop tracking to prevent overheating of the apparatus in the event that the flow of fluid through the tube 6 is obstructed. In this arrangement, the general principle is to deactivate the tracking means when an excessive temperature is sensed on the tube 6. In the illustrated arrangement, a bi-metallic element 154 is mounted on the tube 6 and is arranged to lie just beneath the arm 74 of the drive mechanism. The arm 74 is provided with a lockable hinge 156 which is arranged to be tripped by the bi-metallic element 154 on overheating of the tube 6 so as to effectively decouple the drive arrangement. Once the hinge 156 of the arm 174 has been tripped, it will cause the arm 74 to go slack and the trough will simply rotate to its neutral position and will no longer follow the sun. A similar effect could be achieved by causing the drum 40 to become rotatable at higher temperatures and this could be achieved by mounting the drum 80 by means of fuseable material such as solder. The arrangement illustrated in FIGS. 1 to 26 inherently achieve the same result by excessive thermal expansion of the wire 59 which would cause the trough support 8 to rest against fixed components and so prevent further rotation.

FIGS. 25 and 26 illustrate a modified mechanical arrangement which effectively eliminates the need for the transverse beam 34 which in practise needs to be quite substantial so as to effectively resist the tensile forces in the rods 44 and 46. In the modified arrangement, a tube 158 of rectangular cross-section is pivotally mounted over the bar 20 by means of a pin 160, washers 162 being located between the inner faces of the tube 158 and the bar 20, as illustrated in FIG. 26. Arms 164 and 165 project outwardly from the ends of the tube 158 and the spring 48 which serves as a mounting for the rods 44 and 46 is connected to the free end of the lower arm 164. The relatively large tensile forces which are generated in the rods 44 and 46 are countered by tension rods 166, 167, 168 which act between the arm 164 and tube 158, and between the arm 165 and tube 158, and between the arm 165 and the transverse beam 136 respectively. Any changes in the effective length of the pair of rods 44 and 46 is accommodated by means of pivoting of the tube 158 about the pin 160. It is to be noted that with the configuration as illustrated the only members which are under compression are the arms 164 and 165 and these are not subjected to any substantial bending movements and thus can be of comparatively light construction in view of the sizes of the forces generated in the rods 44 and 46. It is preferred that the pin 160 be located at the combined centre of gravity of the tube 158, arms 164 and 165, and tension rods 166 and 167 so that rotations of the tube 158 does not affect the overall balance of the system. The balance is also not disturbed significantly if perpendicular lines from the ends of the rod 168 and rods 44, 46 pass through the pin 160.

The end supports 14 could be replaced by frame members which act as supports for glass panels of the housing 12. The upper frame member is preferably of pyramid construction and has the end of the wire 59 affixed to its apex. This construction has been found to be particularly light and strong. The load on the apex of the pyramid frame by the wire 59 is directed inwardly and tends to rotate the pyramid frame inwardly from the base. Such inward rotation can be restrained by one of a pair of light tension members acting between the base of the pyramid frame and the outer side of the other frame member.

The claims defining the invention are as follows:

1. Solar energy conversion apparatus comprising concentrating means carried in a support structure for concentrating solar energy onto at least one surface, tracking means including first and second elongate metallic members which are disposed relative to the concentrating means to be differentially heated by the concentrated solar energy when the concentrating means is misaligned with the sun, the differential heating of said metallic members producing differential thermal linear expansions thereof and drive means for producing tracking movements of said concentrating means in response to said differential linear expansions of said metallic members, one end of each of said members being resiliently connected to said support structure.

2. Solar energy conversion apparatus comprising a framework, a support structure rotatably mounted by hollow bearing members in said framework for rotation about an axis, a heat transfer conduit located along said axis and passing through said hollow members, concentrating means carried by the support structure and operable to concentrate solar energy onto at least part of said conduit, tracking means including first and second elongate metallic members which are disposed relative to the concentrating means to be differentially heated by the concentrated solar energy when the concentrating means is misaligned with the sun, the differential heating of said metallic members producing differential thermal linear expansions thereof and drive means for producing tracking movements of said concentrating means in response to said differential linear expansions of said metallic members.

3. Solar energy conversion apparatus comprising concentrating means for concentrating solar energy onto at least one surface, tracking means including first and second elongate metallic members which are disposed relative to the concentrating means to be differentially heated by the concentrated solar energy when the concentrating means is misaligned with the sun, the differential heating of said metallic members producing differential thermal linear expansions thereof, one end of each of said members being connected to a rotatable body which is rotated in accordance with the differential expansions of said members, and drive means for producing tracking movements of said concentrating means in response to rotation of said body.

4. Solar energy conversion apparatus comprising concentrating means for concentrating solar energy onto at least one surface, tracking means including first and second elongate metallic members which are disposed relative to the concentrating means to be differentially heated by the concentrated solar energy when the concentrating means is misaligned with the sun, the differential heating of said metallic members producing differential thermal linear expansions thereof and drive means for producing tracking movements of said concentrating means in response to said differential linear expansions of said metallic members, and radiation shielding means located between said first and second members for preventing unwanted radiation from striking said members.

5. Solar energy conversion apparatus as in any one of claims 4, 1, 2 or 3 wherein said first and second elongate metallic members are straight rods arranged in spaced-apart, coextensive parallel relationship.

6. Solar tracking apparatus comprising focussing means, mounting means mounting the focussing means for tracking movements of the sun, drive means including heat expansible members movable with the focussing means, said heat expansible members being disposed relative to the focussing means so as to receive different amounts of solar radiation from the focussing means when the focussing means is misaligned with the sun so as to produce a differential expansion therein, the drive means being operable on differential expansion of said heat expansible members to cause movement of the focussing means in a direction towards realignment with the sun and wherein said mounting means includes bearings supporting the focussing means at opposite ends thereof for rotation about an axis, said bearings permitting axial movement of the focussing means, tension means being provided between the focussing means and mounting means and operable to limit said axial movement at least in one direction relative to the mounting means, and wherein said tension means comprises an elongate member extending lengthwise at a location at least adjacent said axis and between opposed ends of the focussing means adjacent said bearing, said elongate member being secured at one end against lengthwise movement relative to the mounting means and at the other end against lengthwise movement relative to the focussing means, whereby when the mounting means is positioned with the said axis non-horizontal with the said one end of the elongate member uppermost, tendency of the focussing means to move downwardly along said axis by gravitational force is resisted by the said elongate member.

7. Apparatus as claimed in claim 6 wherein said elongate member is a wire.

8. Apparatus as claimed in claim 7 wherein said mounting means includes; a pair of spaced upwardly extending support portions which respectively receive said bearings; a tube being provided extending generally coaxially along said axis for flow of fluid to be heated by the apparatus, the said bearings being hollow and the said tube extending at either end therethrough, a central portion of the tube being mounted for rotation with the focusing means and end portions thereof being mounted to respective ones of the support portions of said mounting means said end portions being interconnected with the central portion by fluid tight couplings, the said wire extending through the central portion of the said tube and thence through one said end portion of the tube to the said one end of the wire which is secured, against lengthwise movement, to one of said support portions, the wire also extending at the said other end thereof to a coupling member within said central portion of the tube and to which the other wire end is secured against lengthwise movement.

9. Apparatus as claimed in claim 8 wherein the said bearings comprise ball bearings having outer annular races carried by the respective ones of said support portions of the mounting means and inner annular races carried by the said focusing means, balls of each said ball bearing being restrained against lengthwise movement relative to one of the races of that bearing, but the other race of that bearing presenting an annular surface which is flat and parallel to the bearing axis, when viewed in axial section, and against which the balls of that bearing engage in a manner such that they can move in the axial direction, along that annular surface.

10. Solar tracking apparatus for tracking the sun comprising focussing means, mounting means mounting the focussing means for tracking movements of the sun, drive means including heat expansible members movable with the focussing means, said heat expansible members being disposed relative to the focussing means so as to receive different amounts of solar radiation from the focussing means when the focussing means is misaligned with the sun so as to produce a differential expansion thereof, the drive means being operable on differential expansion of said heat expansible members to cause movement of the focussing means in a direction towards realignment with the sun, and wherein the focussing means includes first and second parabolic portions having first and second focal lines respectively and first and second planes respectively which include said first and second focal lines and in cross-section include the axis of the first and second parabolic portions respectively, and wherein said first and second planes are each spaced from a central tracking plane of the apparatus by a distance d and are each parallel thereto, and wherein the mounting means mounts the focussing means for rotation about a rotation axis which is parallel to, between and equidistant from the first and second focal lines, and wherein said heat expansible elements comprise at least two metallic members which are generally located in the first and second planes respectively but extend diagonally relative to said first and second focal lines, and wherein the mounting means includes a framework and a support structure being mounted in said framework for rotation about said rotation axis and wherein said metallic members are coupled between said support structure and said framework whereby differential thermal expansions therein effect rotation of the support structure relative to the framework, the first and second members having one end thereof resiliently connected to the support structure, and wherein the drive means further includes a body which is mounted on the support structure for rotation relative thereto about a second axis which is generally perpendicular to the members, the other end of each of said members being coupled to said body at points on opposite sides of said second axis whereby expansion of one or other of the members causes rotation of the body about said second axis.

11. Apparatus as claimed in claim 10 wherein the focussing means comprises a reflective parabolic trough.

12. Apparatus as claimed in claim 10 or 11 wherein said drive means further includes a drum carried by the framework, an arm extending from said body and a flexible line extending from the arm about said drum whereby rotation of said body about said second axis causes relative movement between the line and the drum to thus cause rotation of the support structure relative to the framework.

13. Apparatus as claimed in claim 12 wherein the arm is generally T-shaped and has one leg extending generally parallel to the rotation axis and a cross-leg generally perpendicular thereto, the ends of said line being connected to ends of said cross-leg and said line convoluting at least once about said drum.

14. Apparatus as claimed in claim 12 wherein the members project above the first and second focal lines of the parabolic portions and the parts of said members above said focal lines being thermally shielded.

15. Apparatus as claimed in claim 10 wherein the centre of gravity of the support structure and focussing means being at or near said rotation axis, said body having a weight connected thereto, which, when said body is rotated by expansion of one or other of said members, causes the support structure and focussing means to become unbalanced and thus rotates under gravity about said rotation axis.

16. Apparatus as claimed in claim 10 wherein the first and second members have first and second slots which are located adjacent and parallel to said first and second focal lines respectively whereby when the tracking plane of the apparatus is near alignment with the sun, solar energy from the first parabolic portion is reflected onto the first member and solar energy reflected from the second parabolic portion passes through the slot in said second member and impinges upon the first member.

17. Apparatus as claimed in claim 16 wherein said members are of flat cross secton with longer cross-sectional dimensions parallel to the said tracking plane and arranged side-by-side; said slot of each member extending between locations adjacent but spaced from opposite side edges of that member and at an angle to such side edges and from one major face of that member to the other.

18. Apparatus as claimed in claim 17 wherein portions of the members above the said slots are positioned further away from the said tracking plane than portions therebelow.

19. Apparatus as claimed in claim 18 wherein shielding of the parts of said members above said focal lines is effected by a housing having a reflective baffle for reflecting light onto one member which has passed through the slot in the other rod.

20. Apparatus as claimed in claim 18 or claim 19 wherein upper edges of the members, at the location of the said slots, are shielded by respective reflective elements to reflect radiation away therefrom.

21. Apparatus as claimed in claim 18 wherein a reflective shield is located between the members at locations along the members and below the focussing means to reduce unwanted radiation striking the members from opposed sides of the trough.

22. Apparatus as claimed in claim 21 wherein said focussing means comprises a plurality of ribs spaced from one another in the direction of extent of the focussing means and extending transversely to said direction, the said ribs having concave parabolic edges aligned when viewed in the direction of extent of the trough, the said parabolic portions being formed from respective sheets interconnected with the ribs so as to extend in the said lengthwise direction between the said ribs and resiliently deformed thereagainst to assume the same concave parabolic configuration of the said edges, when viewed in the direction of extent of the focussing means.

23. Apparatus as claimed in claim 22 wherein the said sheets have upturned flanges at opposed edges thereof the sheets being arranged with said flanges extending lengthwise of the said trough so that one said flange of each said sheet extends lengthwise along a respective outer lengthwise extending edge of the trough and the outer said flanges of the sheets extend in adjacent parallel relationship lengthwise of the trough in contact with a central lengthwise extending abutment interconnecting central portion of the said ribs, the said other flanges abutting the said abutment and means being provided resiliently biasing said further flanges in a direction towards the said ribs, the said one flange being provided with resilient means resiliently biasing these against outer ends of the ribs and biasing the said one flange inwardly.

24. Apparatus as claimed in claim 23 wherein the said resilient means comprises spring clips.

25. Apparatus as claimed in claim 10 further including energy collecting means located to receive reflected energy at said first and second focal lines.

26. Apparatus as claimed in claim 25 wherein the collecting means comprises a tube through which heat transfer fluid is passed.

27. Apparatus as claimed in claim 26 wherein said tube is stationary relative to the focussing means.

28. Apparatus as claimed in claim 25 or 26 including photo-electric elements mounted upon the tube.

29. Apparatus as claimed in claim 10 wherein the members are connected, at ends thereof remote from the said one ends thereof, to the said mounting means by means of a resilient connection maintaining said members in tension.

30. Apparatus as claimed in claim 29 wherein the said members are of flat cross-sectional configuration with longer cross-sectional dimensions parallel to the said tracking plane and extending in side-by-side relation, one to either side of said tracking plane, the said remote ends thereof having means interposed therebetween to constrain them against movement transverse to the said tracking plane and to constrain the members against rotation about lengthwise axes thereof.

* * * * *